July 30, 1935.  G. R. SHUCK  2,009,708
METERING SYSTEM
Filed Oct. 13, 1934   3 Sheets—Sheet 1
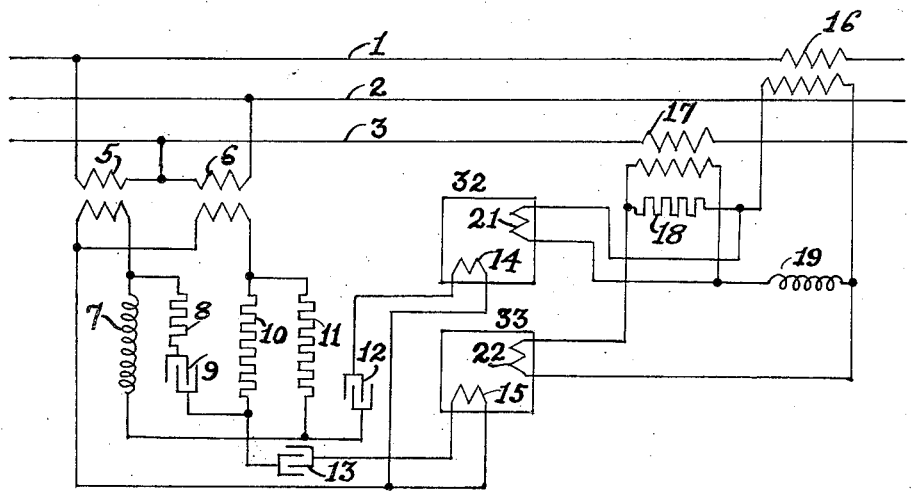
FIGURE I
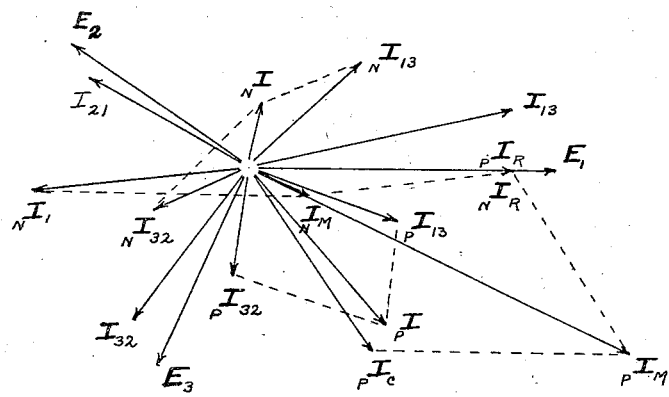
FIGURE II
Gordon R. Shuck
INVENTOR July 30, 1935.  G. R. SHUCK  2,009,708
METERING SYSTEM
Filed Oct. 13, 1934  3 Sheets-Sheet 2
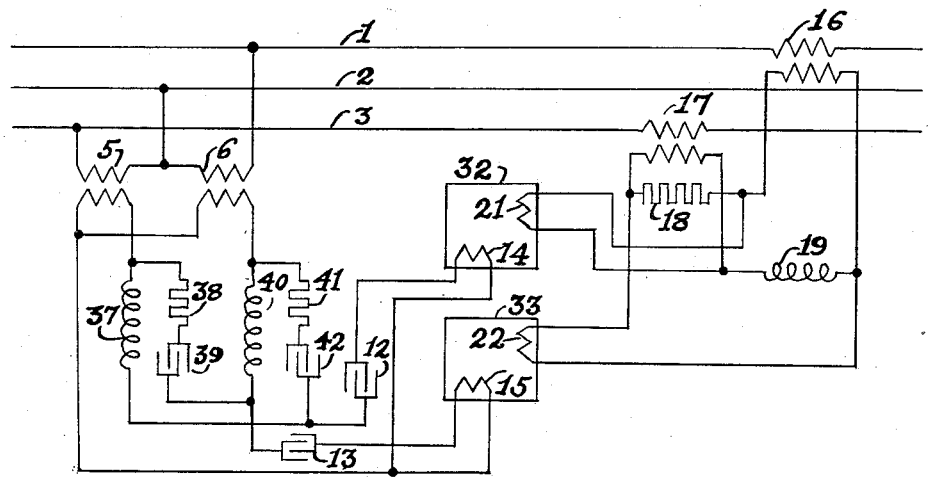
FIGURE III
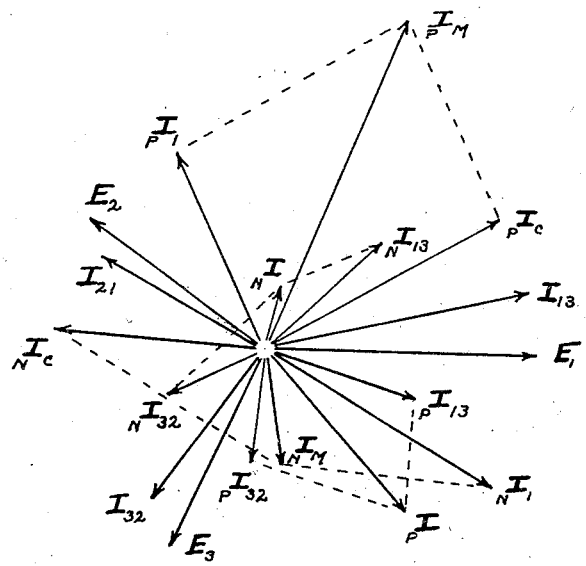
FIGURE IV  Gordon R. Shuck July 30, 1935.    G. R. SHUCK    2,009,708
METERING SYSTEM
Filed Oct. 13, 1934    3 Sheets-Sheet 3
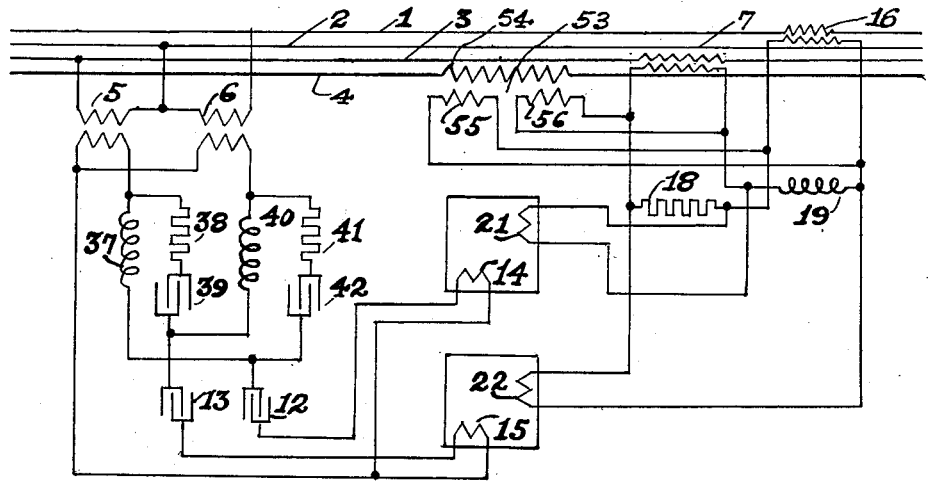
FIGURE V
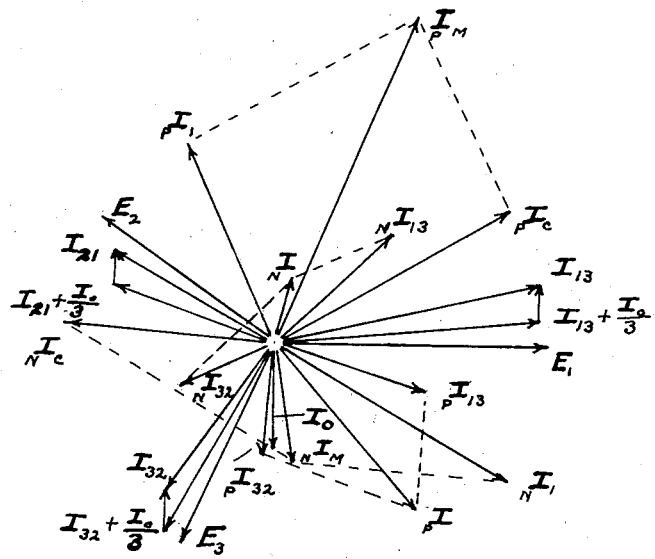
FIGURE VI
Gordon R. Shuck
INVENTOR Patented July 30, 1935

2,009,708

UNITED STATES PATENT OFFICE 2,009,708

METERING SYSTEM

Gordon R. Shuck, Seattle, Wash.

Application October 13, 1934, Serial No. 748,199

29 Claims. (Cl. 171—34)

My invention relates to the indication and measurement of power and energy in polyphase alternating current systems, particularly the simultaneous measurement of the individual components of power or energy described as the positive and negative phase sequence components. The application of my invention includes its use for effecting the utilization of positive and negative phase sequence components for the operation of wattmeters, watt-hour meters, protective relays and control apparatus causing them to function in response to either power or reactive volt-amperes.

It is well understood in this art that an unbalanced polyphase system can be resolved into a positive phase sequence system, a negative phase sequence system, and a zero phase sequence system. Each system has its valuation of watts and reactive volt-amperes. The total power in an unbalanced polyphase system is the sum of the positive phase sequence power, the negative phase sequence power, and the zero phase sequence power. In polyphase systems having isolated neutrals, such as three-phase three-wire systems, the zero phase sequence power is zero, and the total power is the sum of the positive and negative phase sequence power; and the total reactive volt-amperes is equal to the sum of the positive and negative phase sequence reactive volt-amperes.

The measurement of positive and negative phase sequence power in polyphase systems has been accomplished by others, but not in the particular way in which my invention accomplishes it. My invention makes possible the simultaneous measurement or segregation of the positive phase sequence and the negative phase sequence components in polyphase systems by the use of circuits which enable this to be accomplished with fewer parts and more simple connections than are required by hitherto known methods.

What my invention accomplishes and comprises is set forth in the specifications following and is succinctly defined in the appended claims. In the accompanying drawings which are a part of the specifications, Figure I is a diagrammatic representation of my invention arranged for the measurement of positive and negative phase sequence watts when electrodynamometer type meters are used, and positive and negative phase sequence reactive volt-amperes when induction type meters are used. Figure II is a vector diagram of the voltages and currents of the circuits shown in Figure I.

Figure III is a diagrammatic representation of my invention arranged for the measurement of positive and negative phase sequence watts when inductive type meters are used, and positive and negative phase sequence reactive volt-amperes when electrodynamometer type meters are used. Figure IV is a vector diagram of the voltages and currents of the circuits shown in Figure III.

Figure V is a diagrammatic representation of my invention arranged for the measurement of the positive and negative phase sequence components of watts or reactive volt-amperes in three-phase four-wire systems. Figure VI is a vector diagram of the voltages and currents of the circuit shown in Figure V.

The general form of the potential circuits shown in Figures I, III and V resembles potential circuits used by others, but in them there are certain important elements of novelty. The current circuits shown in Figures I and III have been taken from the known art. The combination of the already known current circuits with the novel potential circuits of my invention, together with certain instrumentalities, accomplishes the simultaneous measurement or segregation of the positive phase sequence and the negative phase sequence components of power and reactive volt-amperes, requiring, as shown, but one potential network and but one current network.

In Figure I, three conductors 1, 2, and 3, carry three phase alternating current. Connected to conductors 1, 2 and 3 there are two potential transformers 5 and 6 which deliver current to a circuit containing an inductance 7, three resistors 8, 10, and 11, three condensers 9, 12, and 13, and two wattmeter potential coils 14 and 15. Connected to conductors 1 and 3 there are two current transformers 16 and 17 which deliver current to a circuit containing an inductance 19, a resistor 18, and two wattmeter current coils 21 and 22. Potential coil 14 and current coil 21 comprise the wattmeter 32. Potential coil 15 and current coil 22 comprise the wattmeter 33. Elements numbered 7 to 13 inclusive are embraced in what is known as a potential network composed of a positive phase sequence network and negative phase sequence network. Elements numbered 16 to 22 inclusive form what is known as a current network.

Between conductors 1 and 2 there is a voltage $_LE_2$, between conductors 2 and 3 there is a voltage $_LE_1$, and between conductors 1 and 3 there is a voltage $_LE_3$. Conductors 1, 2, and 3 carry currents $_LI_{32}$, $_LI_{21}$ and $_LI_{13}$ respectively, composed of positive and negative phase sequence components. Potential transformers 5 and 6 are connected to conductors 1, 2, and 3 so that they deliver at their terminals voltages E₃ and E₁ respectively proportional to $_LE_3$ and $_LE_1$. The voltage E₃ causes a current $_nI_1$ to flow through the inductance 7, and a current $_pI_c$ to flow in resistor 8 and condenser 9. The current $_nI_1$ lags sixty electrical degrees behind voltage E₃. The current $_pI_c$ leads the voltage E₃ by sixty degrees. The voltage E₁ causes currents $_pI_r$ and $_nI_r$ to flow in resistors 10 and 11 respectively. The numerical values of impedance of inductance 7 and resistance of the resistor 11 are equal; and the numerical values of the impedance of the circuit composed of the resistor 8 and condenser 9, and resistance of the resistor 10 are equal.

The condenser reactance of the condenser 12 is made numerically equal to the inductive reactance of the potential coil 14 of the meter 32; and the condensive reactance of the condenser 13 is made numerically equal to the inductive reactance of the potential coil 15 of the meter 33.

The current $_nI_1$ is combined with current $_nI_r$ to form $_nI_m$ which is caused to flow in coil 14. The currents $_pI_c$ and $_pI_r$ are combined to form a current $_pI_m$ which flows in coil 15. Since the resistances of coils 14 and 15 are negligible compared to the high impedances of the potential network, the magnitudes and phase relations of currents $_pI_m$ and $_nI_m$ are controlled by the potential network impedances.

In the current circuit of Figure I, the current transformers 16 and 17 respectively deliver currents I₃₂ and I₁₃ which are proportional to the currents $_LI_{32}$ and $_LI_{13}$. The current I₁₃ divides into two currents, $_nI_{13}$ which flows in coil 21 and resistor 18, and $_pI_{13}$ which flows in coil 22 and inductance 19. The current $_nI_{13}$ leads current I₁₃ by thirty degrees, and the current $_pI_{13}$ lags current I₁₃ by thirty degrees. The current I₃₂ divides into two currents, $_nI_{32}$ which flows in inductance 19 and coil 21, and $_pI_{32}$ which flows in resistor 18 and coil 22. Current $_nI_{32}$ lags current I₃₂ by thirty degrees and current $_pI_{32}$ leads current $_LI_{32}$ thirty degrees.

Current $_nI_{13}$ combined with current $_nI_{32}$ gives current $_nI$ which flows in coil 21 and is proportional to the negative phase sequence components of current $_LI_{32}$, $_LI_{21}$ and $_LI_{13}$. Current $_pI_{13}$ combined with current $_pI_{32}$ gives current $_pI$ which flows in coil 22 and is proportional to the positive phase sequence component of currents $_LI_{32}$, $_LI_{21}$ and $_LI_{13}$.

If meters 32 and 33 are electrodynamometer type indicating or integrating meters, they will indicate or integrate respectively negative phase sequence watts and positive phase sequence watts.

If meters 32 and 33 are induction type indicating or integrating meters, they will indicate or integrate respectively negative phase sequence reactive volt-amperes and positive phase sequence reactive volt-amperes.

In Figure III, a modified arrangement of my invention is shown, greatly enlarging its scope of usefulness. The relative arrangement of the current and potential transformers has been changed. The current network is the same as in Figure I, but the impedances of the potential network has been changed. The 60 degree inductive coil 7 of Figure I has been replaced by a 30 degree inductance 37. The resistor 8 and condenser 9 of Figure I are replaced by a resistor 38 and condenser 39 comprising a 30 degree condensive impedance. The resistor 11 of Figure I is replaced by a resistor 41 and condenser 42 comprising a 30 degree condensive impedance. The condensive reactances 12 and 13 are equal respectively to the inductive reactances of the potential coils of meters 32 and 33. The numerical impedance of coil 37 is equal to the numerical impedance of the circuit comprising resistor 41 and condenser 42. The numerical impedance of coil 40 is equal to the numerical impedance of the circuit comprising resistor 38 and condenser 39.

With the arrangement shown in Figure III, if the meters 32 and 33 are electrodynamometer type indicating or integrating meters, they will indicate or integrate respectively negative phase sequence reactive volt-amperes and positive phase sequence reactive volt-amperes. If the meters 32 and 33 are inductive type indicating or integrating meters, they will indicate or integrate respectively the negative phase sequence watts and positive phase sequence watts.

In order to show clearly the broad scope of this invention it is desirable to include in this specification a table showing the units segregated when using different types of meters combined with either Figure I or Figure III.

| | Circuit used | Type meter | Unit metered | |
|---|---|---|---|---|
| | | | Meter 22 | Meter 23 |
| 1 | Figure I | Indicating elec. dyn | N P S W | P P S W |
| 2 | Figure I | Integrating elec. dyn | N P S W hr | P P S W hr |
| 3 | Figure I | Indicating induction | N P S R V A | P P S R V A |
| 4 | Figure I | Integrating induction | N P S R V A hr | P P S R V A hr |
| 5 | Figure II | Indicating elec. dyn | N P S R V A | P P S R V A |
| 6 | Figure II | Integrating elec. dyn | N P S R V A hr | P P S R V A hr |
| 7 | Figure II | Indicating induction | N P S W | P P S W |
| 8 | Figure II | Integrating induction | N P S W hr | P P S W hr |

N P S W = Negative phase sequence watts.
N P S R V A = Negative phase sequence reactive volt-amperes.
P P S W = Positive phase sequence watts.
P P S R V A = Positive phase sequence reactive volt-amperes.

The mathematical proof of the above statements relating to the currents and voltages in Figures I and III and shown vectorially in Figures II and IV can be made by conventional methods and therefore it is not deemed necessary to include such proof as part of this specification.

Inasmuch as all systems in the prior art, as far as I am aware, require either four potential transformers and two current transformers, or two potential transformers and four current transformers to accomplish simultaneous measurement of positive phase and negative phase sequence power, my invention is deemed novel in that this is accomplished using only two potential and two current transformers.

In Figure V a novel current circuit is used, inasmuch as the current circuits now known in the art, such as the one shown in Figure I, are not adequate for use with three-phase four-wire systems. My current circuit differs from the circuits of others in the addition of transformer 53. In three-phase four-wire circuits, a zero phase sequence current $I_0$ may flow in the fourth conductor 4. It has been established in this art that the zero phase sequence current $I_0$ flowing in the neutral conductor, is composed in effect of three equal currents, $$\frac{I_0}{3}$$

flowing in the three conductors. In my invention the zero phase sequence component of current is removed from the currents used in energy measurements. The secondary current of transformer 16 is $$I_{32}+\frac{I_o}{3},$$

but the current required for correct operation of the current network is $I_{32}$. The current in coil 54 of transformer 53 is $I_0$. The ratio of transformation between coil 54 and coils 55 and 56 is three times that between the primaries and secondaries of transformers 16 and 17. If the secondary of transformer 16 is carrying a component of zero phase sequence current, coil 55 will be carrying an equal component. The polarities of transformers 16, 17 and 53 are arranged so that zero phase sequence components of current in the secondary coils circulate between them, leaving only the positive and negative phase sequence currents to flow in the current network. If $I_0$ is of zero magnitude, the transformer 53 has no effect on the rest of the circuit, and is omitted when the three phase system is composed of only three conductors.

Although Figure V shows this novel current network combined with the potential network of Figure III, it is obvious that it will function just as effectively when combined with the potential network of Figure I, and either arrangement is implied in these specifications.

While the general arrangement shows condensers 12 and 13 in Figure I and condensers 12 and 13 in Figures III and V these may be omitted from the circuits when the inductive reactance of the potential coil circuit is very low and negligible as is the case in some electro-dynamometer type wattmeters and watt-hour meters.

The current circuits shown in Figures I and III are not new and have been used by others in segregating the positive and negative phase sequence components of current in three-phase three-wire systems. But the combination shown in Figure V has to my knowledge never been used and is novel. Therefore, in addition to having a novel method of simultaneously segregating the positive and negative phase sequence components of power or reactive volt-amperes, it is desirable to include as part of this invention the separate and independent segregation of these components in three-phase four-wire systems. For example, it may be desirable to segregate only the positive phase sequence components, in which case items 7, 11, 12 and 32 in Figure V may be omitted from the circuit if a small impedance equal to, and substituted for, the current coil 21 is used. In like manner, if it is desirable to segregate only the negative phase sequence components, items 8, 9, 10, 13 and 33 may be omitted if a small impedance equal to, and substituted for, the current coil 22 is used.

In the preceding explanation of Figures I, III and V reference is made to instrumentalities 32 and 33 as watt-meters. This is for convenience only, and is not intended to imply a limitation of my invention to the use of metering apparatus. Any electric responsive devices having potential coils and current coils, such as power relays, wattmeters, watt-hour meters and control apparatus are implied in the broad term electric responsive devices.

I claim:

1. In combination with a three-wire three-phase system; two potential transformers; a potential network consisting of two resistors, two condensive reactances, one condensive impedance and one inductive impedance; two electric responsive devices of the electro-dynamometer type; two current transformers; one load current network for segregating the positive and negative phase sequence components of load current; all arranged in relation to each other in such a way as to cause two added currents to flow through the first of said condensive reactances and the potential coil of the first electric responsive device, one of said added currents being supplied by the secondary winding of the first potential transformer through the inductive impedance of the said potential network, the other of said added currents being supplied by the secondary winding of the second potential transformer through the first resistor of the said potential network; and to cause two added currents to flow through the second condensive reactance and the potential coil of the second electric responsive device, one of said added currents being supplied by the secondary winding of the first potential transformer through the condensive impedance of said potential network, the other of said added currents being supplied by the secondary winding of the second potential transformer through the second resistor of the said potential network; and to cause two added currents to flow through the current coil of the first wattmeter, one of said added currents being supplied by the secondary winding of the first current transformer through the inductive impedance of the load current network, the other of said added currents being supplied by the secondary winding of the second current transformer through the resistance of the load current network; and to cause two added currents to flow through the current coil of the second wattmeter, one of said added currents being supplied by the secondary winding of the first current transformer through the resistance of the load current network, the other of said added currents being supplied by the secondary winding of the second current transformer through the inductive impedance of the load current network; all currents in the coils of the electric responsive device being of such magnitude and phase relations as to cause one electric responsive device to function proportionally to the positive phase sequence watts, and the other electric responsive device to function proportionally to the negative phase sequence watts.

2. In combination with a three-wire three-phase system; two potential transformers; a potential network consisting of two resistors, two condensive reactances, one condensive impedance and one inductive impedance; two electric responsive devices of the induction type; two current transformers; one load current network for segregating the positive and negative phase sequence components of load current; all arranged in relation to each other in such a way as to cause two added currents to flow through the first of said condensive reactances and the potential coil of the first electric responsive device, one of said added currents being supplied by the secondary winding of the first potential transformer through the inductive impedance of the said potential network, the other of said added currents being supplied by the secondary winding of the second potential transformer through the first resistor of the said potential network; and to cause two added currents to flow through the second condensive reactance and the potential coil of the second electric responsive device, one of the said added currents being supplied by the secondary winding of the first potential transformer through the condensive impedance of said potential network, the other of said added currents being supplied by the secondary winding of the second potential transformer through the second resistor of the said potential network; and to cause two added currents to flow through the current coil of the first watt-meter, one of said added currents being supplied by the secondary winding of the first current transformer through the inductive impedance of the load current network, the other of said added currents being supplied by the secondary winding of the second current transformer through the resistance of the load current network; and to cause two added currents to flow through the current coil of the second wattmeter, one of said added currents being supplied by the secondary winding of the first current transformer through the resistance of the load current network, the other of said added currents being supplied by the secondary winding of the second current transformer through the inductive impedance of the load current network; all currents in the coils of the electric responsive device being of such magnitude and phase relations as to cause one electric responsive device to function proportionally to the positive phase sequence reactive volt-amperes, and the other electric responsive device to function proportionally to the negative phase sequence reactive volt-amperes.

3. In combination with a three-wire three-phase system; two potential transformers; a potential network consisting of two condensive impedances, two inductive impedances and two condensive reactances; two electric responsive devices of the induction type; two current transformers, one load current network for segregating the positive and negative phase sequence components of load current; all arranged in relation to each other in such a way as to cause two added currents to flow through the first of said condensive reactances and the potential coil of the first electric responsive device, one of said added currents being supplied by the secondary winding of the first potential transformer through the first inductive impedance of said potential network, the other of said added currents being supplied by the secondary winding of the second potential transformer through the first condensive impedance of the potential network; and to cause two added currents to flow through the second condensive reactance and the potential coil of the second electric responsive device, one of said added currents being supplied by the secondary winding of the first condensive impedance, the other of said added currents being supplied by the second potential transformer through the second inductive impedance of the said potential network; and to cause two added currents to flow through the current coil of the first electric responsive device, one of said added currents being supplied by the secondary winding of the first current transformer through the inductive impedance of the load current network, the other of said added currents being supplied through the resistance of the load current network; and to cause two added currents to flow through the current coil of the second electric responsive device, one of said added currents being supplied by the secondary winding of the first current transformer through the resistance of the load current network, the other of said added currents being supplied by the secondary winding of the second current transformer through the inductive impedance of the load current network; all currents in the coils of the electric responsive devices being of such magnitudes and phase relations as to cause one electric responsive device to function proportionally to the positive phase sequence watts, the other electric responsive device to function proportionally to the negative phase sequence watts.

4. In combination with a three-wire three-phase system; two potential transformers; a potential network consisting of two condensive impedances, two inductive impedances, and two condensive reactances; two electric responsive devices of the electrodynamometer type; two current transformers, one load current network for segregating the positive and negative phase sequence components of load current; all arranged in relation to each other in such a way as to cause two added currents to flow through the first of said condensive reactances and the potential coil of the first electric responsive device, one of said added currents being supplied by the secondary winding of the first potential transformer through the first inductive impedance of said potential network, the other of said added currents being supplied by the secondary winding of the second potential transformer through the first condensive impedance of the potential network; and to cause two added currents to flow through the second condensive reactance and the potential coil of the second electric responsive device, one of said added currents being supplied by the secondary winding of the first potential transformer through the second condensive impedance, the other of said added currents being supplied by the second potential transformer through the second inductive impedance of the said potential network; and to cause two added currents to flow through the current coil of the first electric responsive device, one of said added currents being supplied by the secondary winding of the first current transformer through the inductive impedance of the load current network, the other of said added currents being supplied through the resistance of the load current network; and to cause two added currents to flow through the current coil of the second electric responsive device, one of said added currents being supplied by the secondary winding of the first current transformer through the resistance of the load current network, the other of said added currents being supplied by the secondary winding of the second current transformer through the inductive impedance of the load current network; all currents in the coils of the electric responsive devices being of such magnitudes and phase relations as to cause one electric responsive device to function proportionally to the positive phase sequence reactive volt-amperes, the other electric responsive device to function proportionally to the negative phase sequence reactive volt-amperes.

5. In combination with a three phase system two potential transformers, the primaries of which are connected in open delta to conductors of said system, a positive phase sequence network consisting of one resistance and one condensive impedance, said positive phase sequence network receiving current from the secondary winding of each transformer and passing said added currents through a condensive reactance and the potential coil of a positive phase sequence electric responsive device; a negative phase sequence network consisting of a resistance and inductive impedance, said negative phase sequence network receiving current from the secondary winding of each potential transformer and passing said added currents through a condensive reactance and the potential coil of a negative phase sequence electric responsive device; the said currents in each potential coil of the electric responsive devices reacting with the segregated load current components flowing through the current coils of the electric responsive devices; to cause the positive phase sequence responsive device to respond in accordance with positive phase sequence watts if said device is the electrodynamometer type, and to cause the positive phase sequence device to respond to positive phase sequence reactive volt amperes if said device is the induction type; and to cause the negative phase sequence electric responsive device to respond in accordance with negative phase sequence watts if said device is the electrodynamometer type, and to cause the negative phase sequence electric responsive device to respond to negative phase sequence reactive volt-amperes if said device is the induction type.

6. In combination with a three phase system two potential transformers, the primaries of which are connected in open delta to conductors of said system, a positive phase sequence network consisting of one condensive impedance and one inductive impedance, said positive phase sequence network receiving current from the secondary winding of each transformer and passing said added currents through a condensive reactance and the potential coil of positive phase sequence electric responsive device; a negative phase sequence network consisting of an inductive impedance and condensive impedance, said negative phase sequence network receiving current from the secondary winding of each potential transformer and passing said added currents through a condensive reactance and the potential coil of a negative phase sequence electric responsive device; the said currents in each potential coil of the electric responsive devices reacting with the segregated load current components flowing through the current coils of the electric responsive devices; to cause the positive phase sequence electric responsive device to respond in accordance with the positive phase sequence watts if said device is the induction type, and to cause the positive phase sequence electric responsive device to respond in accordance with positive phase sequence reactive volt amperes, if said device is the electrodynamometer type; and to cause the negative phase sequence electric responsive device to respond in accordance with negative phase sequence watts if said device is the induction type, and to cause the negative phase sequence electric responsive device to respond to negative phase sequence reactive volt-amperes if said device is the electrodynamometer type.

7. A system for metering simultaneously the positive and negative phase sequence components of power in a three phase circuit, said system comprising a positive and negative phase sequence potential network, a positive and negative phase sequence current network, and positive and negative phase sequence electric responsive devices, arranged so that the potential coil of the positive phase sequence meter carries a current having a component leading a voltage of said three phase circuit by 30°, and a component lagging a second voltage of said three phase circuit by 30°; the potential coil of the negative phase sequence electric responsive device carrying a current having a component lagging the first voltage by 30°, and a component leading the second voltage by 30°, the current coil of the positive phase sequence electric responsive device carrying a current having a component leading one of the currents of said three phase system by 30°, and a component lagging the second current of said three phase system by 30°; the current coil of the said negative phase sequence electric responsive device carrying a current having a component lagging the first mentioned current of said three phase system by 30°, and a component leading the said second current by 30°; the currents in the coils of the electric responsive devices coacting such that the positive and negative phase sequence devices respond respectively to positive and negative phase sequence watts if of induction type, and respond respectively to positive and negative sequence reactive volt-amperes if of the electrodynamometer type.

8. A system for metering simultaneously the positive and negative phase sequence components of power in a three phase system, said system comprising a positive and negative phase sequence potential network, a positive and negative phase sequence current network, and positive and negative phase sequence electric responsive devices; arranged so that the potential coil of the positive sequence electric responsive device carries a current having a component in phase with one of the three phase circuit voltages, and a component leading by 60° a second of the three phase voltages, the potential coil of the negative phase sequence electric responsive device carrying a current having a component in phase with the first of the three phase voltages and a component lagging by 60° the second of the three phase voltages; the current coil of the positive phase sequence electric responsive device carrying a current having a component leading by 30° one of the currents in the three phase system, and a component lagging by 30° a second of the currents of the three phase system; the current coil of the negative phase sequence electric responsive device carrying a current having a component lagging by 30° the first of the three phase currents, and a component leading by 30° the second of the three phase currents; the currents in the coils of the electric responsive devices coacting such that the positive and negative phase sequence electric responsive devices respond respectively to positive and negative phase sequence watts if of the electrodynamometer type, and respond respectively to positive and negative phase sequence reactive volt-amperes if of the induction type.

9. In combination with a three-phase three-wire system, two potential transformers, one positive phase sequence network, one negative phase sequence network, two electric responsive devices, two current transformers, a load current network for segregating the positive and negative phase sequence components of load current, said networks receiving currents from the instrument transformers and passing said currents through the windings of said electric responsive device, the currents reacting to cause one device to indicate proportionally to the total watts of the system, the other device to indicate zero, when the said system is of positive phase sequence and balanced; and to cause the other device to read proportionally to the total watts of the system and the first device to indicate zero, when the system is of negative phase sequence and balanced.

10. In combination with a three-phase three-wire system, two potential transformers, one positive phase sequence network, one negative phase sequence network, two electric responsive devices, two current transformers, a load current network for segregating the positive and negative phase sequence components of load current, said networks receiving currents from the instrument transformers and passing said currents through the windings of said electric responsive device, the currents reacting to cause one device to indicate proportionally to the total reactive volt-amperes of the system, the other device to indicate zero, when the said system is of positive phase sequence and balanced; and to cause the other device to read proportionally to the total reactive volt-amperes of the system and the first device to indicate zero, when the system is of negative phase sequence and balanced.

11. A positive, negative, and zero phase sequence segregating network which comprises, in connection with a three-phase four-wire circuit, line transformers whose secondary coils provide currents containing positive, negative, and zero phase sequence components of the currents in said three-phase four-wire system, and a neutral transformer whose secondary coils provide currents containing only a zero phase sequence component of the current in said three-phase four-wire system, each of the secondary coils of said line transformers connected in parallel with a secondary coil of said neutral transformer in such a way that the zero phase sequence components of current present in said coils circulate in the closed circuit comprising said coils in parallel.

12. In a three-phase four-wire system in combination with two potential transformers, the primaries of which are connected in open delta to the three lines of the said system, a positive phase sequence system, a negative phase sequence system, two power measuring devices, means for receiving currents from the secondary of each potential transformer and passing these currents through said networks, means for combining said currents to cause resultant currents proportional to the positive and negative phase sequence voltage of the system to flow through the potential coils of the power measuring devices, a load current network for segregating the positive, negative, and zero phase sequence currents, means for allowing only the positive phase sequence component to flow through the current coil of one power measuring device, the negative phase sequence current through the other power measuring device, said networks being of such a character as to cause one power measuring device to indicate proportionally to the positive phase sequence watts, the other power measuring device to indicate proportionally to the negative phase sequence watts.

13. In a three-phase four-wire system in combination with two potential transformers, the primaries of which are connected in open delta to the three lines of the said system, a positive phase sequence system, a negative phase sequence system, two power measuring devices, means for receiving currents from the secondary of each potential transformer and passing these currents through said networks, means for combining said currents to cause resultant currents proportional to the positive and negative phase sequence voltage of the system to flow through the potential coils of the power measuring devices, a load current network for segregating the positive, negative, and zero phase sequence currents, means for allowing only the positive phase sequence component to flow through the current coil of one power measuring device, the negative phase sequence current through the other power measuring device, said networks being of such a character as to cause one power measuring device to indicate proportionally to the positive phase sequence reactive volt-amperes, the other power measuring device to indicate proportionally to the negative phase sequence reactive volt-amperes.

14. In combination with a three-phase four-wire system, two potential transformers, the primaries of which are connected in open delta to the three main conductors of said system, a positive phase sequence potential network which receives two currents, one from the secondary of each potential transformer, and passes said added currents through the potential coil of an electrodynamometer type power responsive device, a negative phase sequence potential network which receives two currents, one from the secondary of each potential transformer and passes said currents through the potential coil of a second electrodynamometer type power responsive device, a load current system for segregating the positive, negative, and zero phase sequence currents consisting of two current transformers the secondaries of which carry the said three components of load currents, a third current transformer the two secondaries of which carry only zero phase sequence currents, a load current network for segregating the positive and negative phase sequence currents, said two secondaries of the third current transformer being interposed between said load current network and secondaries of said two current transformers and in parallel with the secondaries of said two current transformers, in such a manner as to prevent said zero phase sequence current from flowing through said load current segregating network, the said load current segregating network passing the positive phase sequence current through the current coil of one electric power responsive device, and the negative phase sequence component through the current coil of the second electric power responsive device, all of said networks being composed of impedances of such a character as to cause one electric power responsive device to function in response to the positive phase sequence watts, the second electric power responsive device to function in response to the negative phase sequence watts.

15. In combination with a three-phase four-wire system, two potential transformers, the primaries of which are connected in open delta to the three main conductors of said system, a positive phase sequence potential network which receives two currents, one from the secondary of each potential transformer, and passes said added currents through the potential coil of an induction type power responsive device, a negative phase sequence potential network which receives two currents, one from the secondary of each potential transformer and passes said currents through the potential coil of a second induction type power responsive device, a load current system for segregating the positive, negative, and zero phase sequence currents consisting of two current transformers the secondaries of which carry the said three components of load currents, a third current transformer the two secondaries of which carry only zero phase sequence currents, a load current network for segregating the positive and negative phase sequence currents, said two secondaries of the third current transformer being interposed between said load current network and secondaries of said two current transformers and in parallel with the secondaries of said two current transformers, in such a manner as to prevent said zero phase sequence current from flowing through said load current segregating network, the said load current segregating network passing the positive phase sequence current through the current coil of one electric power responsive device, and the negative phase sequence component through the current coil of the second electric power responsive device, all of said networks being composed of impedances of such a character as to cause one electric power responsive device to function in response to the positive phase sequence reactive volt-amperes, the second electric power responsive device to function in response to the negative phase sequence reactive volt-amperes.

16. In combination with a three-phase four-wire system, two potential transformers, the primaries of which are connected in open delta to the three main conductors of said system, a positive phase sequence potential network which receives two currents, one from the secondary of each potential transformer, and passes said added currents through the potential coil of an electrodynamometer type power responsive device, a negative phase sequence potential network which receives two currents, one from the secondary of each potential transformer and passes said currents through the potential coil of a second electrodynamometer type power responsive device, a load current system for segregating the positive, negative, and zero phase sequence currents consisting of two current transformers the secondaries of which carry the said three components of load currents, a third current transformer the two secondaries of which carry only zero phase sequence currents, a load current network for segregating the positive and negative phase sequence currents, said two secondaries of the third current transformer being interposed between said load current network and secondaries of said two current transformers and in parallel with the secondaries of said two current transformers, in such a manner as to prevent said zero phase sequence current from flowing through said load current segregating network, the said load current segregating network passing the positive phase sequence current through the current coil of one electric power responsive device, and the negative phase sequence component through the current coil of the second electric power responsive device, all of said networks being composed of impedances of such a character as to cause one electric power responsive device to function in response to the positive phase sequence reactive volt-amperes, the second electric power responsive device to function in response to the negative phase sequence reactive volt-amperes.

17. In combination with a three-phase four-wire system, two potential transformers, the primaries of which are connected in open delta to the three main conductors of said system, a positive phase sequence potential network which receives two currents, one from the secondary of each potential transformer, and passes said added currents through the potential coil of an induction type power responsive device, a negative phase sequence potential network which receives two currents, one from the secondary of each potential transformer and passes said currents through the potential coil of a second induction type power responsive device, a load current system for segregating the positive, negative, and zero phase sequence currents consisting of two current transformers the secondaries of which carry the said three components of load currents, a third current transformer the two secondaries of which carry only zero phase sequence currents, a load current network for segregating the positive and negative phase sequence currents, said two secondaries of the third current transformer being interposed between said load current network and secondaries of said two current transformers and in parallel with the secondaries of said two current transformers, in such a manner as to prevent said zero phase sequence current from flowing through said load current segregating network, the said load current segregating network passing the positive phase sequence current through the current coil of one electric power responsive device, and the negative phase sequence component through the current coil of the second electric power responsive device, all of said networks being composed of impedances of such a character as to cause one electric power responsive device to function in response to the positive phase sequence watts, the second electric power responsive device to function in response to the negative phase sequence watts.

18. In combination with a three-phase four-wire system, two potential transformers the primaries of which are connected in open delta to the three main conductors of said system, a positive phase sequence potential network which receives two currents, one from the secondary of each potential transformer and passes said added currents through the potential coil of an electrodynamometer type power responsive device; a load current system for segregating the positive, negative, and zero phase sequence currents, consisting of two current transformers the secondaries of which carry the said three components of load currents, a third current transformer, the two secondaries of which carry only zero phase sequence currents, a load current network for segregating the positive and negative phase sequence currents, said two secondaries of the third current transformer being interposed between the said load current network and the secondaries of said two current transformers and in parallel with the secondaries of the said two current transformers, in such a way as to prevent the zero phase sequence current from flowing through the load current segregating network, the said load current segregating network passing the positive phase sequence current through the current coil of the power responsive device, all of said networks being composed of impedances of such a character as to cause the power responsive device to function in response to positive phase sequence watts.

19. In combination with a three-phase four-wire system, two potential transformers the primaries of which are connected in open delta to the three main conductors of said system, a negative phase sequence potential network which receives two currents, one from the secondary of each potential transformer and passes said added currents through the potential coil of an electro-dynamometer type power responsive device; a load current system for segregating the positive, negative, and zero phase sequence currents, consisting of two current transformers the secondaries of which carry the said three components of load currents, a third current transformer, the two secondaries of which carry only zero phase sequence currents, a load current network for segregating the positive and negative phase sequence currents, said two secondaries of the third current transformer being interposed between the said load current network and the secondaries of said two current transformers and in parallel with the secondaries of the said two current transformers, in such a way as to prevent the zero phase sequence current from flowing through the load current segregating network, the said load current segregating network passing the negative phase sequence current through the current coil of the power responsive device, all of said network being composed of impedances of such a character as to cause the power responsive device to function in response to negative phase sequence watts.

20. In combination with a three-phase four-wire system, two potential transformers the primaries of which are connected in open delta to the three main conductors of said system, a positive phase sequence potential network which receives two currents, one from the secondary of each potential transformer and passes said added currents through the potential coil of an induction type power responsive device; a load current system for segregating the positive, negative and zero phase sequence currents, consisting of two current transformers the secondaries of which carry the said three components of load currents, a third current transformer, the two secondaries of which carry only zero phase sequence currents, a load current network for segregating the positive and negative phase sequence currents, said two secondaries of the third current transformer being interposed between the said load current network and the secondaries of said two current transformers and in parallel with the secondaries of the said two current transformers, in such a way as to prevent the zero phase sequence current from flowing through the load current segregating network, the said load current segregating network passing the positive phase sequence current through the current coil of the power responsive device, all of said networks being composed of impedances of such a character as to cause the power responsive device to function in response to positive phase sequence watts.

21. In combination with a three-phase four-wire system, two potential transformers the primaries of which are connected in open delta to the three main conductors of said system, a negative phase sequence potential network which receives two currents, one from the secondary of each potential transformer and passes said added currents through the potential coil of an induction type power responsive device; a load current system for segregating the positive, negative, and zero phase sequence currents, consisting of two current transformers the secondaries of which carry the said three components of load currents, a third current transformer, the two secondaries of which carry only zero phase sequence currents, a load current network for segregating the positive and negative phase sequence currents, said two secondaries of the third current transformer being interposed between the said load current network and the secondaries of said two current transformers and in parallel with the secondaries of the said two current transformers, in such a way as to prevent the zero phase sequence current from flowing through the load current segregating network, the said load current segregation network passing the negative phase sequence current through the current coil of the power responsive device, all of said networks being composed of impedances of such a character as to cause the power responsive device to function in response to negative phase sequence watts.

22. In combination with a three-phase four-wire system, two potential transformers the primaries of which are connected in open delta to the three main conductors of said system, a positive phase sequence potential network which receives two currents, one from the secondary of each potential transformer and passes said added currents through the potential coil of an induction type power responsive device; a load current system for segregating the positive, negative, and zero phase sequence currents, consisting of two current transformers the secondaries of which carry the said three components of load currents, a third current transformer, the two secondaries of which carry only zero phase sequence currents, a load current network for segregating the positive and negative phase sequence currents, said two secondaries of the third current transformer being interposed between the said load current network and the secondaries of said two current transformers and in parallel with the secondaries of the said two current transformers, in such a way as to prevent the zero phase sequence current from flowing through the load current segregating network, the said load current segregating network passing the positive phase sequence current through the current coil of the power responsive device, all of said networks being composed of impedances of such a character as to cause the power responsive device to function in response to positive phase sequence reactive volt-amperes.

23. In combination with a three-phase four-wire system, two potential transformers the primaries of which are connected in open delta to the three main conductors of said system, a negative phase sequence potential network which receives two currents, one from the secondary of each potential transformer and passes said added currents through the potential coil of an induction type power responsive device; a load current system for segregating the positive, negative, and zero phase sequence currents, consisting of two current transformers the secondaries of which carry the said three components of load currents, a third current transformer, the two secondaries of which carry only zero phase sequence currents, a load current network for segregating the positive and negative phase sequence currents, said two secondaries of the third current transformer being interposed between the said load current network and the secondaries of said two current transformers and in parallel with the secondaries of the said two current transformers, in such a way as to prevent the zero phase sequence current from flowing through the load current segregating network, the said load current segregating network passing the negative phase sequence current through the current coil of the power responsive device, all of said network being composed of impedances of such a character as to cause the power responsive device to function in response to negative phase reactive volt-amperes.

24. In combination with a three-phase four-wire system, two potential transformers the primaries of which are connected in open delta to the three main conductors of said system, a positive phase sequence potential network which receives two currents, one from the secondary of each potential transformer and passes said added currents through the potential coil of an electrodynamometer type power responsive device; a load current system for segregating the positive, negative, and zero phase sequence currents, consisting of two current transformers the secondaries of which carry the said three components of load currents, a third current transformer, the two secondaries of which carry only zero phase sequence currents, a load current network for segregating the positive and negative phase sequence currents, said two secondaries of the third current transformer being interposed between the said load current network and the secondaries of said two current transformers and in parallel with the secondaries of the said two current transformers, in such a way as to prevent the zero phase sequence current from flowing through the load current segregating network, the said load current segregating network passing the positive phase sequence current through the current coil of the power responsive device, all of said networks being composed of impedances of such a character as to cause the power responsive device to function in response to positive phase sequence reactive volt-amperes.

25. In combination with a three-phase four-wire system, two potential transformers the primaries of which are connected in open delta to the three main conductors of said system, a negative phase sequence potential network which receives two currents, one from the secondary of each potential transformer and passes said added currents through the potential coil of an electrodynamometer type power responsive device; a load current system for segregating the positive, negative, and zero phase sequence currents, consisting of two current transformers the secondaries of which carry the said three components of load currents, a third current transformer, the two secondaries of which carry only zero phase sequence currents, a load current network for segregating the positive and negative phase sequence currents, said two secondaries of the third current transformer being interposed between the said load current network and the secondaries of said two current transformers and in parallel with the secondaries of the said two current transformers, in such a way as to prevent the zero phase sequence current from flowing through the load current segregating network, the said load current segregation network passing the negative phase sequence current through the current coil of the power responsive device, all of said networks being composed of impedances of such a character as to cause the power responsive device to function in response to negative phase sequence reactive volt-amperes.

26. In a three phase system in combination with two electric responsive devices of electrodynamometer type having current and potential coils the current coils of said devices being supplied by current from two current transformers through the medium of a load current network for segregating the positive and negative phase sequence components of load current, two potential transformers connected in open delta to said three phase system, the potential windings of said electric responsive devices receiving potential currents from the secondaries of said potential transformers through the medium of a potential network of impedances of such a character as to cause said potential currents to react with the said load current components, so that one electric responsive device is caused to function in response to the positive phase sequence watts, the other electric responsive device to function in response to the negative phase sequence watts.

27. In a three phase system in combination with two electric responsive devices of the induction type having current and potential coils the current coils of said devices being supplied by currents from two current transformers through the medium of a load current network for segregating the positive and negative phase sequence components of load current, two potential transformers connected in open delta to said three phase system, the potential windings of said electric responsive devices receiving potential currents from the secondaries of said potential transformers through the medium of a potential network of impedances of such a character as to cause said potential currents to react with the said load current components, so that one electric responsive device is caused to function in response to positive phase sequence reactive volt-amperes, and the other electric responsive device to function in response to negative phase sequence reactive volt-amperes.

28. In a three phase system in combination with two electric responsive devices of induction type having current and potential coils, the current coils of said devices being supplied by current from two current transformers through the medium of a load current network for segregating the positive and negative phase sequence components of load current, two potential transformers connected in open delta to said three phase system, the potential windings of said electric responsive devices receiving potential currents from the secondaries of said potential transformers through the medium of a potential network of impedances of such a character as to cause said potential currents to react with the said load current components, so that one electric responsive device is caused to function in response to the positive phase sequence watts, the other electric responsive device to function in response to the negative phase sequence watts.

29. In a three phase system in combination with two electric responsive devices of the electrodynamometer type having current and potential coils, the current coils of said devices being supplied by currents from two current transformers through the medium of a load current network for segregating the positive and negative phase sequence components of load current, two potential transformers connected in open delta to said three phase system, the potential windrings of said electric responsive devices receiving potential currents from the secondaries of said potential transformers through the medium of a potential network of impedances of such a character as to cause said potential currents to react with the said load current components so that one electric responsive device is caused to function in response to positive phase sequence reactive volt-amperes, and the other electric responsive device to function in response to negative phase sequence reactive volt-amperes.

GORDON R. SHUCK.